(12) United States Patent
Gillis et al.

(10) Patent No.: US 6,900,957 B2
(45) Date of Patent: May 31, 2005

(54) LUBRICANT DEPLETION DETECTION IN A SELF-HEALING DISK DRIVE

(75) Inventors: Donald Ray Gillis, San Jose, CA (US); Gordon James Smith, deceased, late of Rochester, MN (US); by Molly Smith, legal representative, Rochester, MN (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 362 days.

(21) Appl. No.: 10/161,285

(22) Filed: May 31, 2002

(65) Prior Publication Data

US 2003/0223315 A1 Dec. 4, 2003

(51) Int. Cl.$^7$ .......................... B11B 33/10; G11B 27/36; G11B 19/04; G11B 5/60

(52) U.S. Cl. .......................................... 360/69; 360/75

(58) Field of Search .................. 360/69, 71, 73.03, 360/75, 97.01, 97.02, 97.03, 230, 234–234.1, 128, 133, 135, 137

(56) References Cited

U.S. PATENT DOCUMENTS

| | | | | |
|---|---|---|---|---|
| 4,626,941 A | * | 12/1986 | Sawada et al. | 360/135 |
| 4,789,913 A | * | 12/1988 | Gregory et al. | 360/69 |
| 5,229,899 A | * | 7/1993 | Brown et al. | 360/97.02 |
| 5,309,301 A | * | 5/1994 | Gregory et al. | 360/69 |
| 6,417,981 B1 | * | 7/2002 | Smith | 360/75 |
| 6,459,280 B1 | * | 10/2002 | Bhushan et al. | 324/671 |
| 6,678,113 B2 | * | 1/2004 | Feliss et al. | 360/69 |
| 6,717,671 B1 | * | 4/2004 | Meeks et al. | 356/369 |
| 6,760,175 B2 | * | 7/2004 | Smith | 360/69 |

OTHER PUBLICATIONS

"Simple and Inexpensive Device for Measuring Carbon Wear on Thin Film Disks," May 1993, IBM TDB vol. 36, No. 5, pp. 99–100.*
"Optical Technique for Lubricant Weighing," Jun. 1980, IBM TDB vol. 23, No. 1, pp. 297–299.*
"Method and Apparatus for Simultaneously Measuring Wear and Roughness on Thin Film Disks," IBM TDB vol. 37, No. 4A, pp 267–268.*
"Non–Destructive Measurement of the Lubricant Distribution on Magnetic Disks," Jul. 1985, IBM TDB vol. 28, No. 2, pp. 695–697.*
http://www.stanford.edu/group/i–rite/body_bailey.html.
"No More Hard Drive Crashes? The Interfacial Behavior of Perfluoropolyether Lubricants".

* cited by examiner

Primary Examiner—Sinh Tran
Assistant Examiner—James L Habermehl
(74) Attorney, Agent, or Firm—Bracewell & Patterson, L.L.P.

(57) ABSTRACT

A method and apparatus for detecting lubricant depletion in a disk drive is provided. Disk operation performance parameters are monitored for each of a plurality of zones on the surface of the disk and stored. Examples of performance parameters include dwell time, flying height changes, and data recovery measurements. The performance parameters are compared against predetermined threshold values. If the performance parameters exceed the predetermined threshold values for any of the zones, a potential lubricant depletion or other general degradation problem is flagged for the corresponding zone. Optionally, when a potential lubricant depletion problem is flagged for a particular zone, corrective action is taken. Examples of corrective action include moving recently accessed data from the flagged zone to a zone not identified as having a lubricant depletion problem, moving older archival data to the flagged zone, and/or removing access to the flagged zone.

18 Claims, 6 Drawing Sheets

| DWELL | ZONE 1 | ZONE 2 | ZONE 3 | ... | ZONE M |
|---|---|---|---|---|---|
| <1 sec. | | | | | X |
| >1 and <=10 secs. | X | | | | |
| >10 and <= 100 secs. | | X | | | |
| >100 secs. | | | X | | |

FIGURE 5

LUBRICANT DEPLETION DETECTION IN A SELF-HEALING DISK DRIVE

FIELD OF THE INVENTION

The present invention relates generally to disk drive systems, and more specifically to an apparatus and method for detecting long-term lubricant depletion from a disk surface of a disk drive, and taking appropriate corrective action.

BACKGROUND OF THE INVENTION

The storage capacity of hard disk drives is increasing in rapid fashion. In fact, the capacity of an average disk drive has doubled every 18 months, and, in recent years, has even outpaced the tremendous performance advances in the integrated circuit industry. In order to maintain this explosive increase in capacity, the components that make up the drives are quickly evolving and new technologies are being developed.

As storage densities increase, the distance between the read/write head and the disk surface decreases, since the signal that can be obtained from the data stored within the disk increases as the head moves closer to the disk. This evolution has progressed to the point that, in state-of-the-art drives, the head flies only a few billionths of a meter above the disk. If these dimensions are scaled to more physically tangible values, the system is comparable to a 747 jet flying only a few millimeters above the ground (source: Larry Bailey, "No More Hard Drive Crashes? The Interfacial Behavior of Perfluoropolyether Lubricants", http://www.stanford.edu/group/i-rite/body bailey.html). In a system with tolerances this tight, occasional contact between the head and the disk is inevitable.

A typical disk drive includes substrate material, typically, glass or aluminum, and a number of adhesion-promotion layers, which form a metallic support structure, a magnetic layer for storing data, and finally a thin layer of hard, amorphous carbon. This thin carbon layer protects the soft magnetic layer from damage whenever the head impacts the surface of the disk. The surface of the carbon layer is coated with an extremely thin perfluoropolyether lubricant film. The purpose of this film is to minimize wear of the carbon layer when the head and disk come into contact.

As the magnetic spacing between the head and the disk gets tighter, the protective layer becomes even thinner. In a typical drive, the lubricant is only approximately one molecule thick. Despite this ultra-thin disposition, the lubricant film is very important to the durability of the drive. With lubricant in place, disks typically last years before wearing out, whereas without it, they wear out in a few days.

The lubricant layer also protects the data surface from corrosion and outgassing contaminants. A thinner protective film makes it more likely that in actual use, microscopic contaminants and moisture will penetrate to the magnetic layer. This can lead to corrosion and ultimately cause head crashes, making it impossible to read/write data. In the harsh environments to which handhelds and other mobile devices are exposed, this presents a serious problem and has been a major obstacle to developing greater data densities and wider applications for hard drive technology.

As a result of the foregoing problems, there exists a need for an apparatus and method for performing in-situ detection of lubricant depletion in a disk drive. There is also a need for performing an appropriate corrective action, once lubricant depletion has been detected in one or more zones on a disk.

SUMMARY OF THE INVENTION

The present invention provides a method and apparatus for detecting lubricant depletion in a disk drive. Disk operation performance parameters are monitored for each of a plurality of zones on the surface of the disk, and these performance parameters are stored in a data store. Examples of performance parameters monitored for each of the zones include, but are not limited to, dwell time, head flying height changes, and data recovery procedure measurements. The stored disk operation performance parameters are then compared against predetermined threshold values. If the values of the performance parameters exceed the predetermined threshold values for any of the zones, a potential lubricant depletion problem is flagged for the corresponding zone. Optionally, when a potential lubricant depletion problem is flagged for a particular zone, corrective action is taken. Examples of corrective action include, but are not limited to, moving recently accessed data from the flagged zone to a zone not identified as having a lubricant depletion problem, moving older archival data to the flagged zone, and/or removing access to the flagged zone.

The details of the present invention, both as to its structure and operation, can best be understood in reference to the accompanying drawings, in which like reference numerals refer to like parts.

BRIEF DESCRIPTION OF THE DRAWINGS

FIG. 5 is a table illustrating zone dwell times for a disk drive.

DETAILED DESCRIPTION OF THE PREFERRED EMBODIMENTS

Figure 1:
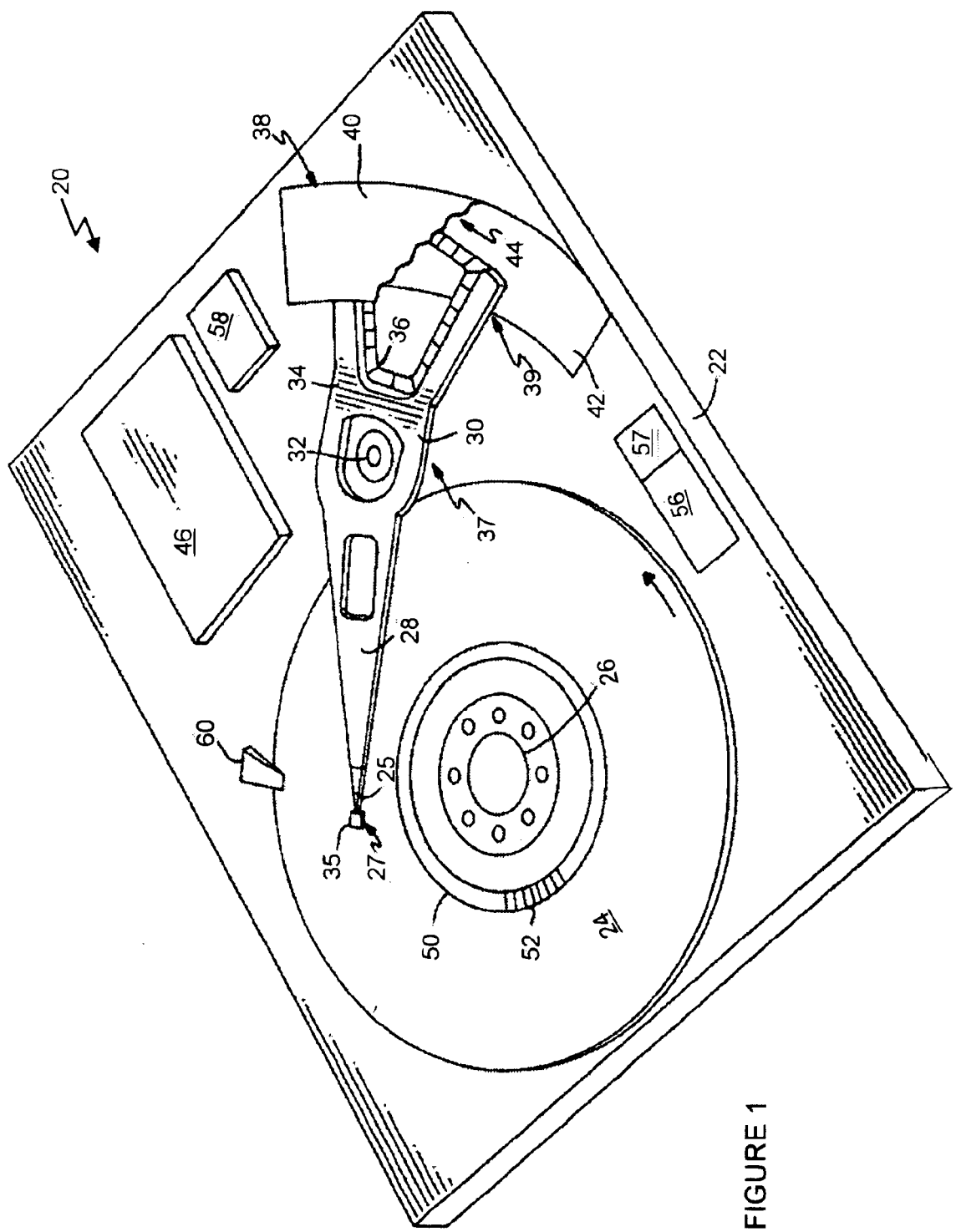
FIG. 1 is a top perspective view of a disk drive system with its upper housing cover removed.
Figure 2:
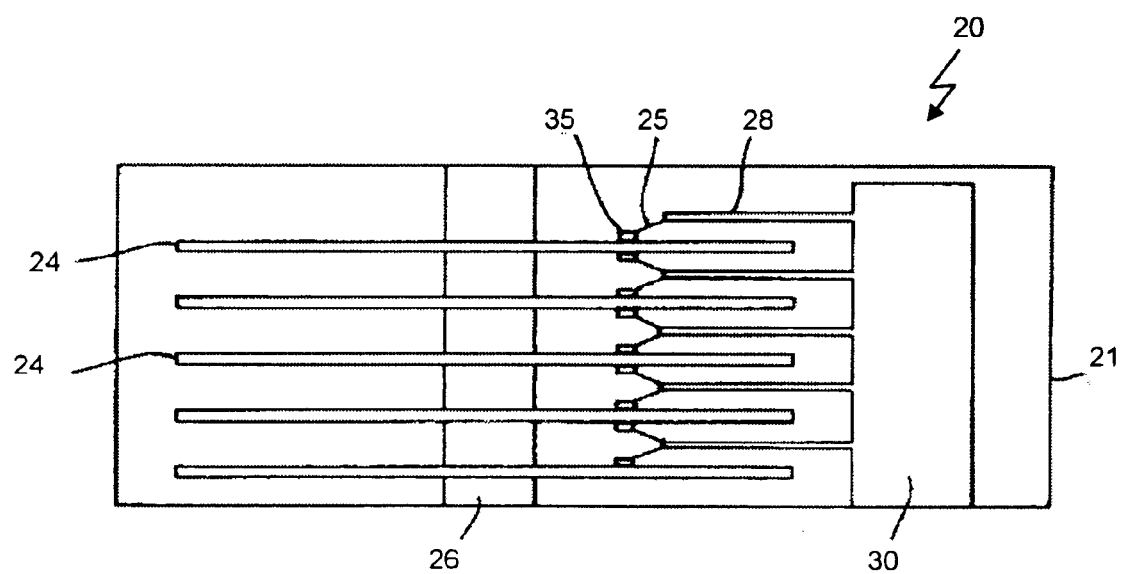
FIG. 2 is a side plan view of a disk drive system comprising a plurality of data storage disks.

Turning to the Drawings, wherein like numbers denote like parts throughout the several views, FIGS. 1 and 2 illustrate a data storage system 20 within which the apparatus and method for detection of lubricant depletion is found. This data storage system 20, as is best shown in FIG. 2, typically includes one or more rigid data storage disks 24 which are stacked coaxially in a tandem spaced relationship, and rotate about a spindle motor 26 at a relatively high rate of rotation.

As is depicted in FIG. 1, each disk 24 is typically magnetically formatted to include a plurality of spaced concentric tracks 50. One or more of the disks 24 may alternatively be magnetically formatted to include a spiraled track configuration, or a combination of concentric and spiraled track configurations. Digital information is typically stored in the form of magnetic transitions along the tracks 50. The tracks 50 are generally divided into a number of sectors 52, with each sector 52 comprising a number of information fields, including fields for storing data, and sector identification and synchronization information, for example. In multi-disk systems, tracks 50 are on the same position on each disk and the group of tracks at each position of the heads is known as the cylinder.

Writing data to a magnetic data storage disk 24 generally involves passing a current through an inductive coil in the write element of the transducer assembly 27 to produce magnetic lines of flux which magnetize a specific location on a surface of the disk 24. Reading data from a specified disk location is typically accomplished by a read element of the transducer assembly 27 sensing the magnetic field or flux lines emanating from the magnetized locations on the surface of the disk 24. As the read element passes over the rotating disk surface 24, the interaction between the read element and the magnetized locations on the disk surface 24 results in the production of electrical signals, commonly referred to as readback signals, in the read element.

An actuator 30 typically includes a number of interleaved actuator arms 28 with each arm having one or more transducer 27 and slider assemblies 35 mounted to a load beam 25 for transferring information to and from the data storage disks. The slider 35 is typically designed as an aerodynamic lifting body that lifts the transducer 27 off the surface as the rate of spindle motor rotation increases and causes the transducer 27 to hover above the disk 24 on an airbearing produced by high speed rotation of the disk. The distance between the slider 35 and the surface of the disk 24, which is typically on the order of 5–100 nanometers (nm) under airbearing conditions, is commonly referred to as head-to-disk clearance or spacing. In contact recording applications, the spacing between the slider 35 and the surface of the disk 24 is zero.

The actuator 30 is typically mounted to a stationary actuator shaft 32 and rotates on the shaft 32 to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38 causing the actuator arms 28, in turn, to sweep over the surface of the data storage disks 24. The spindle motor 26 typically comprises a DC motor energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a servo processor 56. The servo processor 56 controls the direction and magnitude of control current supplied to the voice coil motor 39. The actuator voice coil motor 39 produces a torquing force on the actuator coil frame 34 which controls currents of varying direction and magnitude flowing in the coil assembly 36 in the presence of a magnetic field produced by the permanent magnet structure 38. The torquing forces imparted on the actuator coil frame 34 cause corresponding rotational movement of the actuator arms 28 in directions dependent on the polarity of the control currents flowing in the coil assembly 36.

Figure 3:
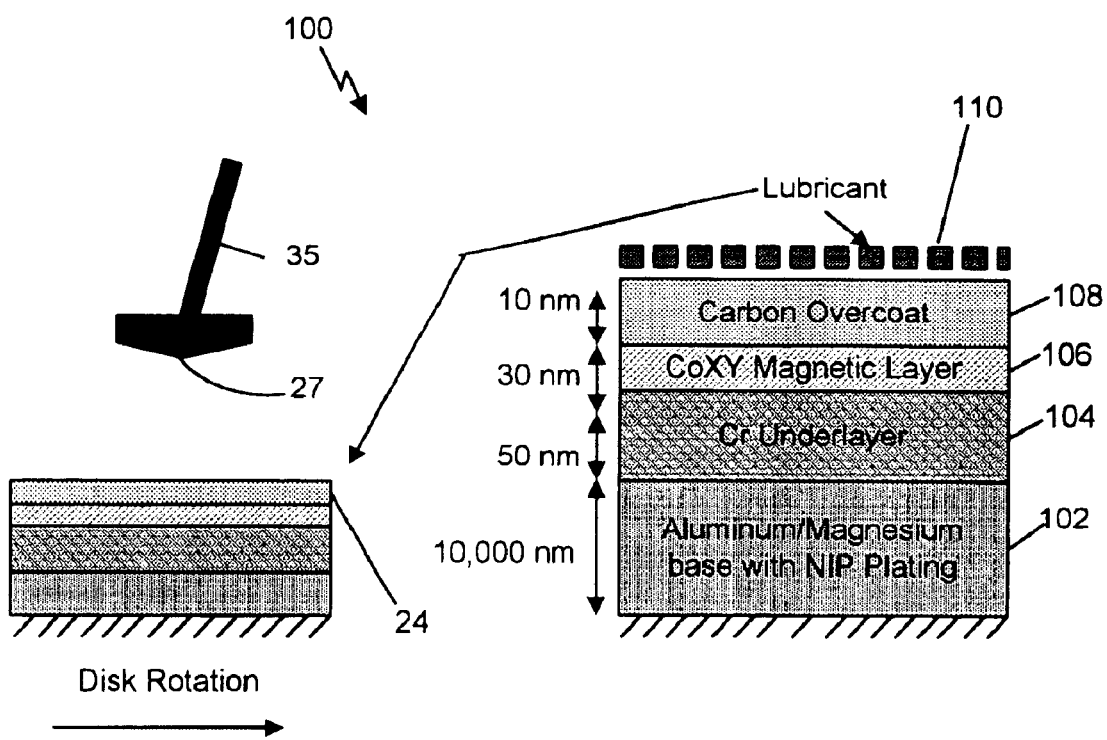
FIG. 3 is a cross-sectional view of a typical hard disk.

FIG. 3 is a cross-sectional view of a typical storage disk 24, shown generally as 100. In a preferred embodiment, a base substrate 102, typically an alloy of aluminum and magnesium which is then plated with a smooth amorphous nickel-phosphorous layer, is employed. Alternatively, base substrate 102 may be glass. In a preferred embodiment, base substrate is approximately 10,000 nm in thickness. Next, a chromium undercoat 104 having a thickness of approximately 50 nm is applied to ensure magnetic film nucleation before a cobalt magnetic alloy 106 having a thickness of approximately 30 nm is sputtered on. Next, an amorphous carbon overcoat 108 having a thickness of approximately 1–5 nm is applied. Finally, completed disks are lubricated with a thin layer of polymer lubricant 110 in order to protect the disk from friction and wear. Today, most disk drives employ perfluoropolyethers (PFPE) as the protective polymer lubricant, as a result of the lubricant's low vapor pressure, low surface tension, high thermal stability, and stability under high shear stress. The hard disk cross section shown in FIG. 3 is provided for illustrative purposes only. Variations in the layers of the hard disk, materials composition, and thicknesses shown may be made while still remaining within the scope and spirit of the present invention.

Figure 4:
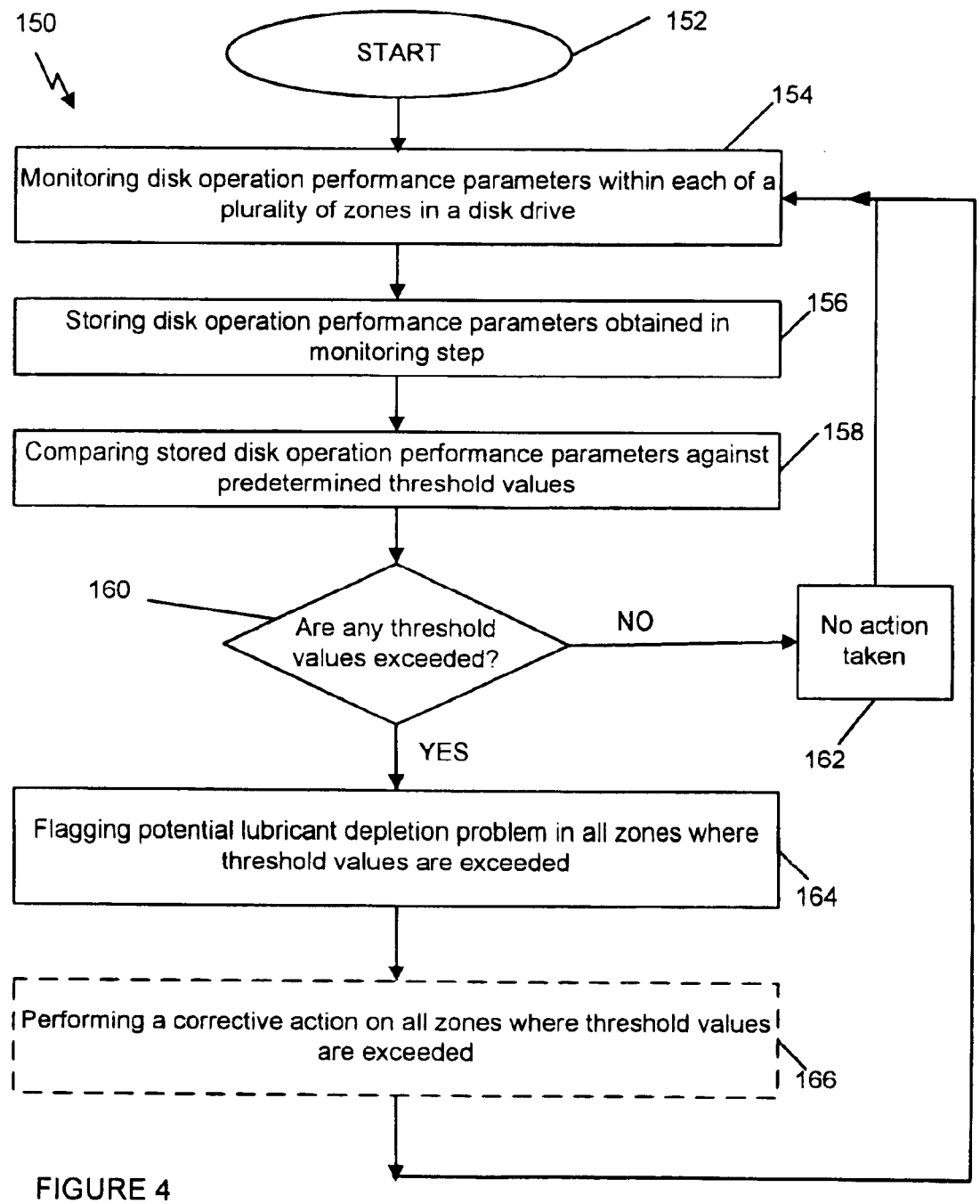
FIG. 4 is a flow chart representation of a method for detecting lubricant depletion in a disk drive in accordance with the present invention.

FIG. 4 is a flow chart representation of a method for detecting lubricant depletion in a disk drive in accordance with the present invention, shown generally at 150. The method begins at block 152. At block 154, disk operation performance parameters are monitored within each of a plurality of zones of the disk drive. These disk operation performance parameters can include, but are not limited to, the number of access to a specific cylinder range, in-situ flyheight change measurements, and utilization of disk recovery procedures. These performance parameters are discussed in more detail in subsequent paragraphs.

Next, at block 156, the disk operation performance parameters obtained by the monitoring operation of block 154 are stored. In a preferred embodiment these parameters can be saved on the disk drive (typically in the reserved area on each disk surface), or alternatively, to a memory within the disk drive.

At block 158, the stored disk operation performance parameters for each of the plurality of zones of the disk drive are compared against one or more predetermined threshold values by a comparator (e.g., functional logic built into the hard disk drive controller or other in-situ microprocessor). This comparison operation can be scheduled to occur periodically during disk drive operation, or may be triggered by a specific event (e.g., extensive use of disk recovery procedures within the drive).

At block 160, if none of the stored disk operation performance parameters exceed the predetermined threshold values, no action is taken, as shown at block 162, and control is returned to block 154. However, if any of the stored disk operation performance parameters exceed the predetermined threshold values, a potential lubricant depletion problem is flagged, as shown at block 164. At block 166, a corrective action is optionally performed if a potential lubricant depletion is identified in any of the zones. After completing block 166, control is returned to block 154.

The present invention presents several alternative approaches to monitoring disk operation performance parameters, as shown in block 154. In a first approach, lubricant depletion is inferred by keeping track of the number of accesses to a specific cylinder range within the disk drive. The "dwell time" in a particular cylinder "zone" is a good indicator of possible lubricant depletion. In other words, the longer a head "dwells" on a track or within a small number of adjacent tracks, the higher the likelihood of lubricant depletion.

As shown in FIG. 5, the cylinders in a disk drive are divided into a number of zones (i.e., regions) corresponding to the physical size of the slider airbearing. As the disk drive undergoes normal operations, the dwell times are tracked on a zone-by-zone basis for the disk drive. Zones which are more frequently accessed (e.g., zone 3) have longer dwell times. The greater the dwell time for a specific zone, the greater the expected lubricant depletion for the specific zone. Once the dwell time for a specific zone exceeds a predetermined threshold, the zone is flagged as having a potential lubricant depletion problem.

Another alternative approach to monitoring disk operation performance parameters is to measure in-situ head flying height changes. In-situ head flying height change measurements can be performed during idle or when data recovery procedures exceed a predetermined number of steps. As the lubricant depletes, the head-to-disk spacing is reduced. This change can be measured using servo burst amplitude, generalized error measurement (GEM), or other in-situ methods. Examples of methods for estimating head flying height can be found in two previously filed applications: Ser. No. 09/811,287, filed Mar. 16, 2001, entitled "Method and Apparatus for Estimating the Flyheight of Airbearing Slider in a Storage Device, and U.S. Ser. No. 09/811,015, filed Mar. 16, 2001, entitled "Method and Apparatus for Estimating the Flyheight of an Airbearing Slider in a Storage Device using Variable Spindle Velocity", hereby incorporated by reference. Both of these applications are assigned to the assignee of the instant application.

Yet another alternative approach to monitoring disk operation performance parameters is to monitor data recovery procedures (DRP). Excessive use of DRP in a range of adjacent tracks and multiple adjacent sectors is an indication of a possible lubricant depletion problem.

As previously shown at block 162, another aspect of the present invention deals with corrective actions once lubricant depletion is assumed to exist within a zone of the disk drive. Once a band of cylinders is found to have lubricant depletion, the first order of business is to move any data accessed in the last N days in the lubricant depleted area to another cylinder range in the disk pack. For example, any data found in the depleted area that is less than 30 days old will be moved to a safe area where there is no (or little) lubricant depletion.

A second step is to take older data (for example data that has not been accessed in the past 3 months) and move it to the lubricant depleted area. In this way, the least frequently accessed data is placed where lubricant is depleted.

A third aspect of the present invention involves removing access to those zones of the disk that are at risk for head-disk interface failure. After extended depletion (that is, the lubricant depletion is judged very severe based on the aforementioned methods), all data is removed permanently from these areas and placed in areas where lubricant levels are acceptable, and access to the severely depleted areas is removed.

Figure 6:
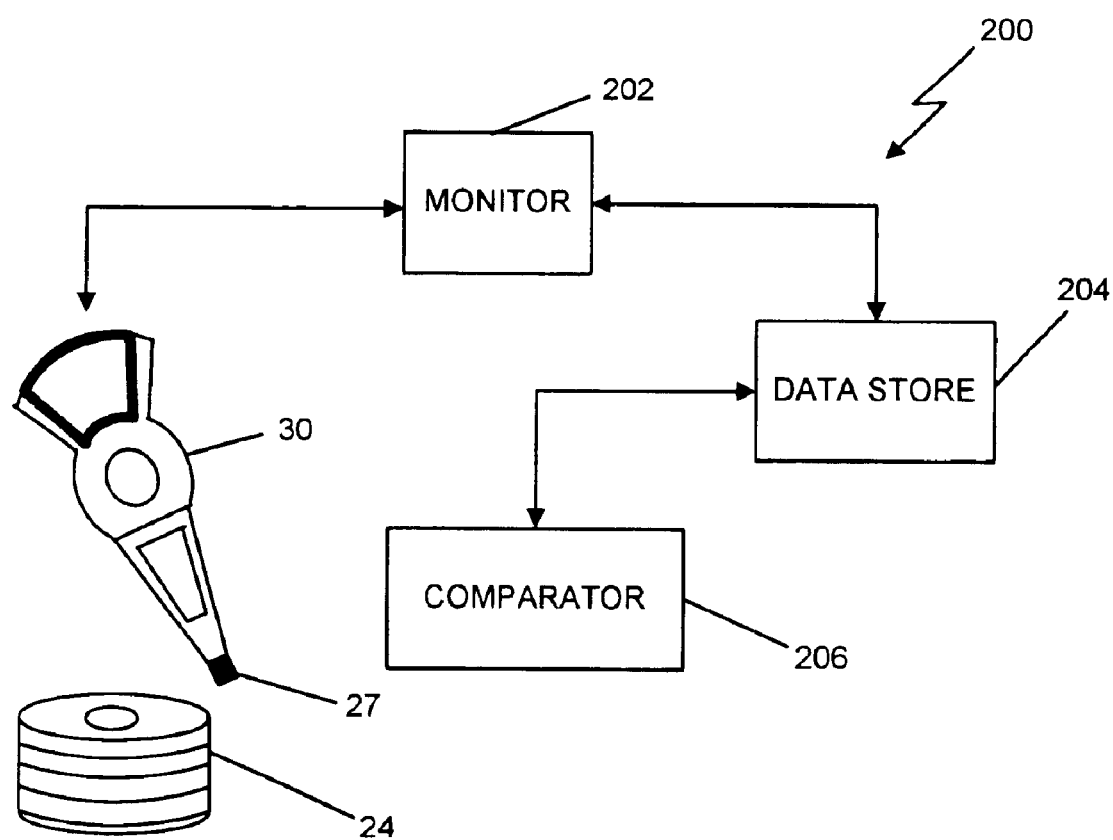
FIG. 6 illustrates a high-level, functional block diagram of the apparatus for detecting long-term lubricant depletion within a disk drive in accordance with the present invention.

FIG. 6 illustrates a high-level, functional block diagram of the apparatus for detecting long-term lubricant depletion within a disk drive in accordance with the present invention, shown generally at 200. The previously described data storage disks 24 and actuator assembly 30 provide operational information to monitor 202 during normal disk operation. In one embodiment, monitor 202 is a hard disk controller (HDC) or associated in-situ microprocessor, capable of detecting and tracking operational characteristics of the head/disk interface during normal operation. Examples of operational characteristics include, but are not limited to, head dwell time within a predefined zone of operation, head-to-disk flyheight measurements (obtained via servo burst amplitude or other measurement means) and/or data recovery procedure measurements provided by actuator/transducer assembly 30, 27. Monitored parameters can be obtained continuously, or the monitoring operation can be performed under special circumstances (e.g., in the case of flyheight, during idle or when data recovery procedures exceed a predetermined number of steps).

Monitor 202 can store and/or accumulate operational characteristics in data store 204 for later analysis. Data store 204 can take various forms, including: a reserved area on storage disk 24, a memory component in the disk drive electronics (not shown), or other storage means external to the disk drive itself.

After operational characteristics are stored in data store 204, a comparator 206 can compare the stored operational characteristics against a set of predetermined threshold values. Comparator 206 can be logic built into the hard disk controller, another in-situ microprocessor associated with the disk controller, or may be performed by a processor external to the disk drive itself. As an example, if the head dwell time for a specific zone exceeds a predetermined time value, a potential lubricant depletion problem is flagged. In another example, if the flyheight change within a particular region exceeds a predetermined value, a potential lubricant depletion problem is flagged. Similarly, if data recovery procedures (DRP) are exercised an excessive number of times within a particular zone, a potential lubricant depletion problem is flagged within this zone.

Additional modifications may be made to the illustrated embodiments without departing from the spirit or scope of the invention. Therefore, the invention lies in the claims hereinafter appended.

What is claimed is:

1. An apparatus for detecting lubricant depletion in a disk drive having a plurality of zones, comprising:

a monitor for monitoring disk operation performance parameters within each of the plurality of zones of the disk drive;

a data store for storing the disk operation performance parameters generated by the monitor;

a comparator for comparing the stored disk operation performance parameters for each of the plurality of zones of the disk drive against one or more predetermined threshold values, and flagging a potential lubricant depletion problem in the zone when any of stored disk operation performance parameters exceed the predetermined threshold values; and wherein the disk operation performance parameters include tracking the number of accesses to each of the plurality of zones.

2. The apparatus of claim 1, wherein each of the plurality of zones is defined by a specific cylinder range.

3. An apparatus for detecting lubricant depletion in a disk drive having a plurality of zones, comprising:

a monitor for monitoring disk operation performance parameters within each of the plurality of zones of the disk drive;

a data store for storing the disk operation performance parameters generated by the monitor;

a comparator for comparing the stored disk operation performance parameters for each of the plurality of zones of the disk drive against one or more predetermined threshold values, and flagging a potential lubricant depletion problem in the zone when any of stored disk operation performance parameters exceed the predetermined threshold values; and wherein the disk operation performance parameters include the amount of time a head of the disk drive spends in each of the plurality of zones.

4. The apparatus of claim 3, wherein each of the plurality of zones is defined by a specific cylinder range.

5. An apparatus for detecting lubricant depletion in a disk drive having a plurality of zones, comprising:

a monitor for monitoring disk operation performance parameters within each of the plurality of zones of the disk drive;

a data store for storing the disk operation performance parameters generated by the monitor;

a comparator for comparing the stored disk operation performance parameters for each of the plurality of zones of the disk drive against one or more predetermined threshold values, and flagging a potential lubricant depletion problem in the zone when any of stored disk operation performance parameters exceed the predetermined threshold values; and wherein the disk operation performance parameters include head flying height change measurements performed within each of the plurality of zones; and wherein the head flying height change measurements are performed during idle.

6. The apparatus of claim 5, wherein the head flying height change measurements are performed when data recovery procedures exceed a predetermined number of steps.

7. The apparatus of claim 6, wherein the head flying height change measurements are performed using servo burst amplitude.

8. The apparatus of claim 5, wherein the head flying height change measurements are measured via generalized error measurement (GEM).

9. An apparatus for detecting lubricant depletion in a disk drive having a plurality of zones, comprising:

a monitor for monitoring disk operation performance parameters within each of the plurality of zones of the disk drive;

a data store for storing the disk operation performance parameters generated by the monitor;

a comparator for comparing the stored disk operation performance parameters for each of the plurality of zones of the disk drive against one or more predetermined threshold values, and flagging a potential lubricant depletion problem in the zone when any of stored disk operation performance parameters exceed the predetermined threshold values; and wherein the disk operation performance parameters include data recovery procedure measurements.

10. An apparatus for detecting lubricant depletion in a disk drive having a plurality of zones, comprising:

a monitor for monitoring disk operation performance parameters within each of the plurality of zones of the disk drive;

a data store for storing the disk operation performance parameters generated by the monitor;

a comparator for comparing the stored disk operation performance parameters for each of the plurality of zones of the disk drive against one or more predetermined threshold values, and flagging a potential lubricant depletion problem in the zone when any of stored disk operation performance parameters exceed the predetermined threshold values; wherein the apparatus includes a processor for performing corrective action when a potential lubricant depletion problem in the zone is flagged by the comparator; and wherein the corrective action includes moving recently accessed data from the zone to another zone not identified as having the potential lubricant depletion problem.

11. The apparatus of claim 10, wherein the corrective action includes moving older archival data to the zone identified as having the potential lubricant depletion problem.

12. The apparatus of claim 10, wherein the corrective action includes removing access to the zone identified as having the potential lubricant depletion problem.

13. A method for detecting lubricant depletion in a disk drive having a plurality of zones comprising the steps of:

monitoring disk operation performance parameters within each of the plurality of zones of the disk drive;

storing the disk operation performance parameters;

comparing the stored disk operation performance parameters for each of the plurality of zones of the disk drive against one or more predetermined threshold values;

flagging a potential lubricant depletion problem in any of the plurality of zones of the disk drive when any of the stored disk operation performance parameters exceed the predetermined threshold values; and performing corrective action when a potential lubricant depletion problem in any of the plurality of zones is flagged by moving recently accessed data from each of the plurality of zones where a lubricant depletion problem exists to an alternate zone.

14. The method of claim 13, wherein the step of performing corrective action when a potential lubricant depletion problem in any of the plurality of zones is flagged further comprises:

moving older archival data to one or more of the plurality of zones where a lubricant depletion problem exists.

15. The method of claim 13, wherein the step of performing corrective action when a potential lubricant depletion problem in any of the plurality of zones is flagged further comprises:

removing access to each of the plurality of zones where a lubricant depletion problem exists.

16. A method for detecting lubricant depletion in a disk drive having a plurality of zones comprising the steps of:

monitoring disk operation performance parameters within each of the plurality of zones of the disk drive;

storing the disk operation performance parameters;

comparing the stored disk operation performance parameters for each of the plurality of zones of the disk drive against one or more predetermined threshold values;

flagging a potential lubricant depletion problem in any of the plurality of zones of the disk drive when any of the stored disk operation performance parameters exceed the predetermined threshold values; and wherein the step of monitoring disk operation performance parameters within each of the plurality of zones of the disk drive further comprises:

tracking the number of disk accesses to each of the plurality of zones.

17. A method for detecting lubricant depletion in a disk drive having a plurality of zones comprising the steps of:

monitoring disk operation performance parameters within each of the plurality of zones of the disk drive;

storing the disk operation performance parameters;

comparing the stored disk operation performance parameters for each of the plurality of zones of the disk drive against one or more predetermined threshold values;

flagging a potential lubricant depletion problem in any of the plurality of zones of the disk drive when any of the stored disk operation performance parameters exceed the predetermined threshold values; and wherein the step of monitoring disk operation performance parameters within each of the plurality of zones of the disk drive further comprises:

monitoring the amount of time a head of the disk drive spends in each of the plurality of zones of the disk drive.

18. The method of claim 13, wherein the step of monitoring disk operation performance parameters within each of the plurality of zones of the disk drive further comprises:

monitoring head height change measurements as each head of the disk drive passes through each of the plurality of zones of the disk drive.

\* \* \* \* \*